Patented May 12, 1942

2,282,816

UNITED STATES PATENT OFFICE 2,282,816

RETARDING DECOMPOSITION OF OILS

Sidney Musher, New York, N. Y., assignor to Musher Foundation Incorporated, New York, N. Y., a corporation of New York No Drawing. Application April 8, 1939, Serial No. 266,856

8 Claims. (Cl. 260—398.5)

This invention relates to means for retarding deterioration and decomposition of animal and vegetable fats and oils.

In accordance wth this invention there are utilized the peanut germs in finely divided form, substantially unbleached and desirably containing organic phosphorus and nitrogen compounds and water soluble carbohydrates for addition to and thorough admixture in glyceride oils and compositions containing them subject to undesirable modifications upon storage.

Desirably these peanut germs should be ground to a paste by subjecting them to a milling operation.

This paste is produced preferably by placing the peanut germs between stone rollers, the bottom of which operates at a slower speed than the top roller and whereby a finely ground oily paste is produced. This pasty material may then be added to the glyceride oil subject to decomposition in an amount of from 0.5% to 5%.

There may also be used in this invention, the residues which are left following the commercial expression or extraction of the oil from such peanut germs. Peanut germ press cake may be utilized for its preservative properties which have been retained to a very substantial degree even following the expression of the oils from those germs. The removal of the oil does not appear to substantially decrease the activity of the germ residues. These press cakes or residues in de-oiled condition should be finely ground and pulverized to a flour form and then added to and admixed in the glyceride oil subject to decomposition.

To a substantial degree, the preservative substances present in these germs remain even following the expression and extraction of the oils therefrom. In a similar manner, the preservative substances do not appear to be associated with the pure phosphatide or with the oil portion or with any other single substance normally present in those germs, but rather appear to be of complex nature and due to the presence of very complex combinations of organic compounds which give rise to their preservative property.

Any desired means or method of separating the germs or embryos from the remainder of the nut materials serving as the source of the germ may be employed. The germ may be removed mechanically as by blowing with air or special blanching operations may be employed.

In addition to the use of the germs in accordance with this invention, there may be also employed solvent extracts of those germs obtained by the use of water and organic solvents, which extracts contain both water soluble carbohydrates, nitrogen and phosphorus compounds in complex form.

Of particular importance are those extracts obtained by the use of a solvent having the formula XOH where X is either hydrogen or a low molecular weight aliphatic radical. These solvents would include water, methyl alcohol, ethyl alcohol, etc., or similar water or alcohol soluble sovents.

In the case of the preparation of the water extract of peanut germ press cakes, the press cake in finely divided or flour form may be admixed with ten times its weight of water at about 135° F. for about 30 minutes. This mixture should be allowed to stand for about 2 to 5 hours and the supernatant water portion removed by siphoning or decantation.

This supernatant water portion should then desirably be evaporated in a vacuum pan under 25 inches of vacuum at 135° F. to produce a concentrated extract having more than 40% total solids. Where it is desired to dry the water extract thus obtained, such drying can be accomplished by drum drying, spray drying, tray drying, etc.

In the case of the preparation of the alcohol soluble extracts, all of the alcohol may be removed by vacuum distillation as above described.

The extracts thus obtained contain both water soluble carbohydrates, nitrogen and phosphorus compound in complex form, whereby they give definite and marked preservative action.

Among the glyceride oils that may be treated in accordance with this invention are the animal and vegetable fats and oils such as lard, cottonseed oil, corn oil, castor oil, tallow, oleo oil, cod liver oil, halibut liver oil, soya bean oil, salmon oil, herring oil, etc., which may be in their crude or refined or partially refined state, or hydrogenated.

The finely divided ground macerated pasty peanut germs or their powdery press cakes or water soluble carbohydrate and phosphorus containing extracts may be added to the glyceride oils and thoroughly admixed therein in a relatively small proportion. Less than 5% will give the desired result and frequently it is desirable to use 2% or less and very often as little as 0.1% will give sufficient protection to the oil to be treated.

The glyceride oils containing any of the added materials may where desired be subjected to agitation at about 150° F. for about 15 to 30 minutes after which the insoluble germ material may be removed by filteration or centrifuging. Where, for example, it is desirable to treat a glyceride oil to help preserve it against decomposition, but it is not desired for the insoluble germ portion to remain in suspension in that oil, such insoluble materials may be filtered from the oils following a mild heat and agitation treatment as at about 150° F. for 15 minutes. During this period the germ is thoroughly mixed in the oil that is treated and then the insoluble portion may be filtered from the treated oil.

The treatment of glyceride oils in this manner will produce a definite and marked preservative effect by which the oil is substantially stabilized against decomposition and deterioration upon storage, and at the same time the germs will impart to the oil desirable flavors and aromas even when used in proportions of less than 2%.

The properties given to the oils when treated in accordance with this invention by the addition thereto of the germs or their de-oiled residues, cannot be obtained in a similar manner by the addition thereto of the oils which are expressed or extracted from those germs or residues.

Where a much more marked preservative action is desired, such germs or deoiled residues or their water or alcohol soluble extracts may be added to the oils subject to decomposition, thoroughly admixed therein and then such oils containing the added germ material heated to a temperature in excess of 175° F. and desirably in excess of 300° F. and most preferably at a temperature of between 350° F. and 400° F. for a short period of time such as for from 10 seconds to 1 hour whereby much more marked preservative action is obtained.

It is not known exactly how this interaction occurs whereby when the germ material is added to the oil and then that oil subjected to an elevated temperature a much more marked preservative action is obtained. There appears to be a chemical action occurring the nature of which cannot at present be described.

It is evident, however, that, contrary to the normal expectation that when an oil is heated to an elevated temperature such as to 400° F. for a short period of time, that the oil would be much more subject to decomposition and deterioration, that when such oil is heated to the elevated temperature with the germ material having been first added to it, that a much more potent preservative effect is obtained.

The following examples are given to exemplify the preservative effects obtained in accordance with this invention and these examples are intended to be merely exemplary of the results that may be obtained.

*Example I*

Peanuts were roasted for 20 minutes at 230° F. The germs were then removed and such germs were crushed between stone rollers with the bottom roller operating at about 70% of the speed of the upper roller. An oily pasty material was obtained. 5% of this macerated pasty peanut germ was added to cod liver oil and thoroughly admixed therein. Samples of the cod liver oil were set aside at 98° F. and peroxide values taken at regular intervals.

|  | Peroxides after— | | | |
|---|---|---|---|---|
|  | 2 days | 6 days | 10 days | 14 days |
| Untreated cod liver oil | 5.9 | 65 | 147 | 236 |
| Cod liver oil containing 5% peanut germ paste | 4.8 | 21.2 | 58 | 83 |
| Cod liver oil containing 5% peanut germ paste heated to 150° F. for 10 minutes with agitation and then filtered to remove the undissolved material | 5.8 | 33 | 89 | 112 |

*Example II*

Peanut germ deoiled residue was ground to a fine flour, having about 25 mesh. This press cake was added to lard, thoroughly admixed in the lard and the lard was tested at 208° F. with air being bubbled through it until rancidity was determined both by peroxide value and organoleptically.

```
                                          Rancid after—
Control lard_____ 1½ hours
Lard containing 1% germ residue_____ 3½ hours
Lard containing 1% germ residue
  heated to 400° F. for 5 minutes in
  the lard and then tested_____ 9¾ hours
```

As indicated above, the water soluble carbohydrate, nitrogen and phosphorus containing extracts of the germs and particularly their water and alcohol soluble extracts may desirably be employed for addition to oils or compositions containing oils subject to decomposition and very desirably when those oils are subsequently heated to elevated temperatures such as to in excess of 250° F.

Particularly in the case of the water soluble extract, such extract may be added to an oil in water emulsion where even though such water soluble extracts are added to and dissolved in the aqueous phase of the oil in water emulsion, they will nevertheless perserve the oil or fat contained in that emulsion.

For example, the concentrated water extract of peanut germ press cake may be added to such oil in water emulsions as a cod liver oil in water emulsion, milk, cream, cream that is subsequently to be used for churning in the manufacture of butter, etc., and desirable improvement in retarding decomposition and deterioration of those products will be obtained.

It is particularly desirable for the emulsion after addition thereto of the water extract to be heated to an elevated temperature such as to in excess of 175° F. following the addition thereto and dispersal therein of the water extract.

The germs or their water or alcohol soluble extracts may desirably be added to aqueous dairy products such as milk or cream, ice cream, and particularly to fruit ice creams such as strawberry ice cream and very desirably to cream that is to be used in the manufacture of butter in which all of the germs or their water soluble portions will be washed out into the buttermilk without in any way contaminating the butter that is churned from the cream.

Other germs and embryos may also similarly be employed even though they contain less than 20% of oil. Such other germs and embryos include particularly wheat germ and corn germ which should desirably be finely divided and pulverized. These germs may be de-oiled by extraction or expression and the residues finely ground to a flour.

It is most desirable with such other germs or embryos whether using the whole ground mass or the deoiled residues to heat the glyceride containing the germ to temperatures in excess of 150° F. or to 250° F. or above for from 0 to 10 minutes followed by removal of the residues by filtration or decantation.

Among the specific embryos which may be used to replace part or all of the peanut germs are wheat germ, corn germ, etc. Less preferably it is possible to use the seeds of the fruits such as apple seeds, watermelon seeds, or even peach kernels.

The oils stabilized according to the present invention may be used for many different purposes and particularly may be used in the manufacture of toilet and other soaps, oil shampoos, for sulfonation, in the leather industry, and for those other industries where glyceride oils are normally employed and where such glyceride oils render the product in which they are used subject to oxidative deterioration. The present application is a continuation in part of application, Serial No. 92,935, filed July 27, 1936 which discloses utilizing water and alcohol soluble extracts of peanut germs for stabilizing organic materials against oxidation, which application in turn continues the subject matter of application, Serial No. 710,727 filed February 10, 1934, now Patent 2,049,017, issued July 28, 1936, and Serial No. 8,411 filed February 26, 1935, now Patent 2,075,824, issued April 6, 1937.

Having described my invention, what I claim is:

1. An antioxygenic preparation comprising substantially fibre free, vacuum concentrated soluble antioxygens extracted from substantially deoiled, finely ground peanut germ, said antioxygens being soluble in a solvent selected from the group consisting of water and alcohol and differing from lecithin in containing water soluble carbohydrates and in being capable of retaining and increasing their antioxygenic activity when heated in excess of 175° F. after addition to an organic material subject to oxidative deterioration, said preparation when added serving to retard such deterioration, said preparation being substantially identical with that produced by mixing deoiled, finely ground peanut germ with a much larger quantity of one of said solvents at a temperature above room temperature and below the boiling point of the solvent, separating the undissolved residue, and concentrating the clarified liquid by vacuum evaporation.

2. An antioxygenic preparation comprising substantially fibre free, vacuum concentrated soluble antioxygens extracted from substantially deoiled, finely ground seed germ, said antioxygens being soluble in a solvent selected from the group consisting of water and alcohol and differing from lecithin in containing water soluble carbohydrates and in being capable of retaining and increasing their antioxygenic activity when heated in excess of 175° F. after addition to an organic material subject to oxidative deterioration, said preparation when added serving to retard such deterioration, said preparation being substantially identical with that produced by mixing deoiled, finely ground seed germ with a much larger quantity of one of said solvents at a temperature above room temperature and below the boiling point of the solvent, separating the undissolved residue, and concentrating the clarified liquid by vacuum evaporation.

3. A method for stabilizing glyceride oil containing compositions against decomposition upon storage which comprises adding to and dispersing in such oil a small amount, less than 5%, of a stabilizing agent selected from the group consisting of finely divided unbleached peanut germ and the water and alcohol soluble extracts described in claim 1.

4. A method for stabilizing glyceride oil containing compositions against decomposition upon storage which comprises adding to and dispersing in such oil a small amount, less than 5%, of a stabilizing agent selected from the group consisting of finely divided unbleached seed germ and the water and alcohol soluble extracts described in claim 2.

5. A method for stabilizing glyceride oils against decomposition upon storage which comprises adding to and dispersing in such oils a small amount, less than 5%, of finely divided unbleached peanut germ and heating said dispersed germ in the oil to an elevated temperature substantially in excess of 250° F. for a short period of time whereby said oil is substantially stabilized against decomposition.

6. A glyceride oil substantially stabilized against decomposition containing dispersed therein a small amount, less than 5%, of a finely divided ground unbleached peanut germ.

7. A method of stabilizing glyceride oil containing compositions against decomposition upon storage which comprises adding to and dispersing in such composition a small amount, less than 5%, of a finely divided ground unbleached peanut germ.

8. A method of stabilizing glyceride oil containing compositions against decomposition upon storage which comprises adding to and dispersing in such composition a small amount, less than 5%, of a finely divided, deoiled peanut germ.

SIDNEY MUSHER.